Feb. 17, 1953        C. B. FORE        2,628,674
GAS INJECTOR FOR CARBON BLACK CONVERTER
Filed Aug. 5, 1948
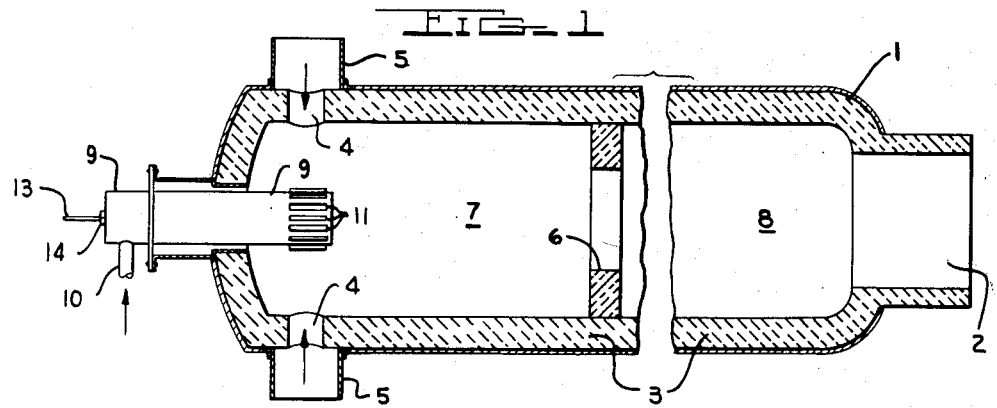
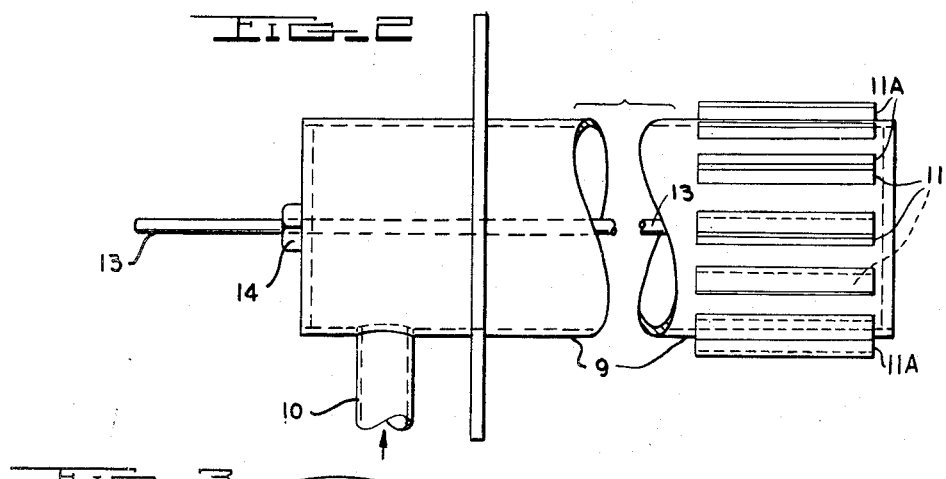
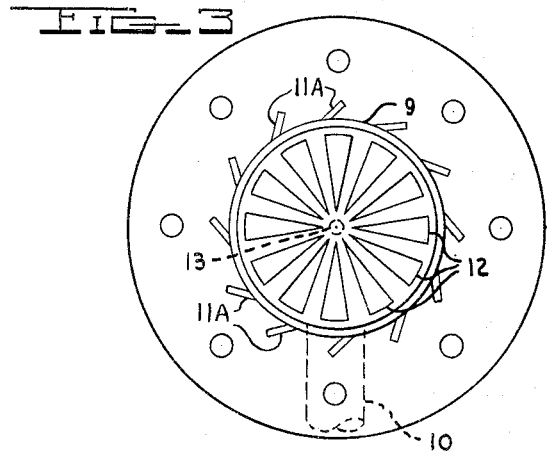
INVENTOR.
CALVIN B. FORE
BY *Arthur M. Smith*
ATTORNEY Patented Feb. 17, 1953

2,628,674

UNITED STATES PATENT OFFICE 2,628,674

GAS INJECTOR FOR CARBON BLACK CONVERTER

Calvin B. Fore, Aransas Pass, Tex., assignor to United Carbon Company, Inc., Charleston, W. Va., a corporation of Maryland Application August 5, 1948, Serial No. 42,724

3 Claims. (Cl. 158—99)

The present invention relates to improvements in apparatus for producing carbon black by the decomposition of hydrocarbon gases, such for example as those contained in natural gas, and in particular the present invention relates to an improved gas injector for such an apparatus.

The present invention is related to the copending application of William F. Seeger, Serial No. 537,437, now abandoned, on apparatus for producing carbon black, owned by our common assignee, United Carbon Co., Inc.

An object of the present invention is to provide a new and efficient gas injector particularly adapted for use in the manufacture of carbon black in a furnace or converter and which will produce a uniform mixture of gas and a predetermined amount of air and distribute said mixture in the furnace or converter where the gas is partially burned to produce carbon black therefrom. The injector of the present invention (1) improves control of the quality of the carbon black produced, (2) stabilizes reaction within furnace and (3) reduces substantially the tendency to form coke on the converter walls.

Another object of the present invention is to provide a means for feeding a mixture of natural gas and air to a carbon black furnace or converter in which the gas is partially burned to produce carbon black and in which provision is made to prevent clogging of the burner or converter so that it will continue to function efficiently.

Other objects of this invention will appear in the following description and appended claims, reference being had to the accompanying drawings forming a part of this specification wherein like reference characters designate the corresponding parts in the several views.

In the drawings:

Fig. 1 is a fragmentary side elevation of a carbon black apparatus partially in section and partially in elevation and utilizing the gas injector of the present invention.

Fig. 2 is an enlarged side elevation of the gas injector shown in Fig. 1.

Fig. 3 is a front elevation showing the discharge end of the injector.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The improvements constituting the present invention may be applied to a carbon black furnace or converter such as the one shown in Fig. 1 which comprises an outer shell 1 preferably formed of steel. The shell 1 communicates with a flue 2 at one end and with a fuel injector at the opposite end. The shell 1 and flue 2 are provided with a lining 3 which is composed of a heat resisting refractory such as fire brick. Air inlet ducts 4 are provided in the refractory and in the periphery of the shell. Air under pressure is introduced in controlled amounts from a suitable source and is led to the ducts through a manifold 5 either directly toward the center of the shell or tangentially thereto by means of a manifold of the construction disclosed by Robert W. Skoog in U. S. Letters Patent No. 2,413,586.

At a point downstream of the converter toward the flue 2, a mixing orifice 6 is located. This divides the converter into two separate sections 7 and 8 which communicate only through the annulus in the orifice 6.

The gas injector of the present invention consists of a cylindrical steel tube 9 to which a tangential gas inlet pipe 10 is attached. The gas injector tube 9 etxends through the end of the converter shell 1. The portion of the tube 9 which extends into the chamber 7 is provided with circumferentially spaced, longitudinally extending slots 11 and has an end portion provided with radially extending spaced end slots 12. If desired, the slots 11 may each be provided with deflecting vanes 11A for directing the gas outward tangentially of the injector. A tubular rod 13 extends along the axis of the cylindrical injector tube 9 and is slidably mounted in a bearing or packing gland 14 provided at the rear end of the tube. One end of the rod 13 contacts the inside face of the end of the tube 9 and its other end extends beyond the other end of the tube 9.

The following is a description of the operation of a converter utilizing a gas injector embodying the present invention:

Natural gas at a constant predetermined rate and volume is introduced through the conduit 10 into the gas injector tube 9 and is discharged into the chamber 7 through the circumferential slots 11 and radial end slots 12 in the tube 9. Air, which is introduced through the ducts 4, is thoroughly admixed with the gas and the diffused gas and air is burned when a combustible mixture is attained. The burning mixture moves turbulently along the chamber 7 where it confronts the mixing orifice 6. The burning gases are further mixed and blended as they pass the orifice 6 into the chamber 8. The products of combustion and decomposed gases pass out of the chamber 8 through the flue 2 carrying with them the produced carbon black. The carbon black suspended in the gases is then collected by any desired means, as for example an electric precipitator.

The amount of air and gas introduced into the chamber 7 is regulated so that the mixture of gas and air is always such that a portion of the gas is not burned but instead is thermally decomposed by the heat supplied by the burned gas and air mixture.

At regular intervals the bar 13 is shaken or jarred thus jarring the gas injector tube 9 and shaking loose any carbon particles which may have a tendency to remain in the slots of the gas injector tube 9, and which otherwise would cause caking and the consequent plugging of the slots in the tube 9.

It has been found that the use of this type of gas injector has produced noticeable increases in the yield of carbon black in processes using the type of converter shown in Fig. 1. It is believed that this is probably due to the better distribution of the gas and its diffusion into the air in the converter as a result of introducing the gas through the circumferentially spaced, longitudinally extending slots 11 and the radial end slots 12. Thus a more uniform admixture of gas and air is effected which improves control of the quality of carbon black produced, stabilizes its reaction within the furnace, reduces the formation of coke and produces a greater yield of carbon black than has been found to be the case where conventional type gas injectors have been used.

Having thus described my invention, I claim:

1. A gas injector for use with a carbon black converter and adapted to distribute a hydrocarbon gas within the carbon black converter and uniformly diffuse the said gas in an air stream therein, said injector comprising a tubular body with flat closed ends, said body having a plurality of circumferentially spaced longitudinally extending slots in the side wall thereof adjacent to and spaced from the discharge end, and said discharge end having a plurality of radially extending spaced slots therein which are in the shape of spaced radial circular sectors, the remainder of the said tubular body being fluid-tight except for a gas inlet conduit extending from the side wall of said body and adapted for detachable connection to a source of gas supply.

2. A gas injector for use with a carbon black converter and adapted to distribute a hydrocarbon gas within the carbon black converter and uniformly diffuse the said gas in an air stream therein, said injector comprising a tubular body with flat closed ends, said body having a plurality of circumferentially spaced longitudinally extending slots in the side wall thereof adjacent to and spaced from the discharge end, said discharge end having a plurality of radially extending spaced slots therein, the remainder of the said tubular body being fluid-tight except for a gas inlet conduit extending from the side wall of said body and adapted for detachable connection to a source of gas supply and a deflecting vane adjacent each of said circumferentially spaced longitudinally extending slots to direct gas issuing from said slots in a direction tangentially outward from the sides of said injector.

3. A gas injector for use with a carbon black converter and adapted to distribute a hydrocarbon gas within the carbon black converter and uniformly diffuse the said gas in an air stream therein, said injector comprising a tubular body with flat closed ends, said body having a plurality of circumferentially spaced longitudinally extending slots in the side wall thereof adjacent to and spaced from the discharge end, said discharge end having a plurality of radially extending spaced slots therein, the remainder of the said tubular body being fluid-tight except for a gas inlet conduit extending from the side wall of said body and adapted for detachable connection to a source of gas supply and a rigid bar extending through the longitudinal axis of said body and through the unslotted end thereof, said bar being slidably movable in a longitudinal direction to move against the central portion of said slotted discharge end and thus jar the injector to dislodge carbon from the slots in said injector.

CALVIN B. FORE.

REFERENCES CITED

The following references are of record in the file of this patent:

UNITED STATES PATENTS

| Number | Name | Date |
|---|---|---|
| 434,013 | Barker | Aug. 12, 1890 |
| 1,305,436 | Blanchard | June 3, 1919 |
| 1,657,995 | Garneau | Jan. 31, 1928 |
| 2,069,062 | Forberg | Jan. 26, 1937 |
| 2,342,228 | Treat | Feb. 22, 1944 |
| 2,375,797 | Krejci | May 15, 1945 |
| 2,413,586 | Skoog | Dec. 31, 1946 |

FOREIGN PATENTS

| Number | Country | Date |
|---|---|---|
| 442,159 | France | June 14, 1912 |